(12) United States Patent
Bex et al.

(10) Patent No.: US 9,604,599 B2
(45) Date of Patent: Mar. 28, 2017

(54) WIPER BLADE DEVICE

(75) Inventors: Koen Bex, Jeuk (BE); Dirk Herinckx, Linter (BE); Helmut Depondt, Kessel-Lo (BE)

(73) Assignee: Robert Bosch GmbH, Stuttgart (DE)

( * ) Notice: Subject to any disclaimer, the term of this patent is extended or adjusted under 35 U.S.C. 154(b) by 497 days.

(21) Appl. No.: 13/994,124

(22) PCT Filed: Nov. 8, 2011

(86) PCT No.: PCT/EP2011/069586
§ 371 (c)(1),
(2), (4) Date: Nov. 12, 2013

(87) PCT Pub. No.: WO2012/079848
PCT Pub. Date: Jun. 21, 2012

(65) Prior Publication Data
US 2014/0189975 A1    Jul. 10, 2014

(30) Foreign Application Priority Data

Dec. 13, 2010   (DE) .................. 10 2010 062 910

(51) Int. Cl.
*B60S 1/38*   (2006.01)

(52) U.S. Cl.
CPC ........... *B60S 1/3851* (2013.01); *B60S 1/3808* (2013.01); *B60S 1/3858* (2013.01); *B60S 1/3877* (2013.01); *B60S 1/3863* (2013.01); *B60S 1/3867* (2013.01)

(58) Field of Classification Search
CPC .... B60S 1/3808; B60S 1/3858; B60S 1/3856; B60S 1/3877

USPC ....................... 15/250.32, 250.201
See application file for complete search history.

(56) References Cited

U.S. PATENT DOCUMENTS

| | | | |
|---|---|---|---|
| 2006/0265830 A1* | 11/2006 | Walworth | B60S 1/38 15/236.02 |
| 2008/0148509 A1* | 6/2008 | Bacarella | B60S 1/3806 15/250.32 |
| 2008/0150193 A1* | 6/2008 | Walworth | B29C 33/76 264/310 |
| 2008/0276404 A1* | 11/2008 | Bauer | B60S 1/38 15/250.361 |
| 2008/0289133 A1* | 11/2008 | Kim | B60S 1/387 15/250.32 |

(Continued)

FOREIGN PATENT DOCUMENTS

| | | |
|---|---|---|
| DE | 10036135 | 2/2002 |
| DE | 102006038828 | 2/2008 |

(Continued)

OTHER PUBLICATIONS

DE102008040063A1 (machine translation), 2010.*
International Search Report for Application No. PCT/EP2011/069586 dated Feb. 16, 2012 (3 pages).

*Primary Examiner* — Andrew A Horton
(74) *Attorney, Agent, or Firm* — Michael Best & Friedrich LLP

(57) ABSTRACT

The invention relates to a wiper blade device comprising a wiper blade adapter (10) and a wiper strip unit (12). According to the invention, said wiper strip unit (12) has at least one securing recess (14) which, in at least one operating state, forms an interlocking connection with the wiper blade adapter (10).

12 Claims, 4 Drawing Sheets

(56) References Cited

U.S. PATENT DOCUMENTS

2010/0293737 A1* 11/2010 Ollier .................. B60S 1/3858
15/250.34

FOREIGN PATENT DOCUMENTS

| DE | 102008040063 A1 * | 1/2010 | ............ B60S 1/3865 |
|----|-------------------|--------|--------------------------|
| EP | 2008891 | 12/2008 | |
| FR | 2915445 | 10/2008 | |
| WO | 2008076402 | 6/2008 | |

\* cited by examiner

WIPER BLADE DEVICE

BACKGROUND OF THE INVENTION

The invention relates to a wiper blade device.

A wiper blade device having a wiper blade adapter and having a wiper strip unit is already known.

SUMMARY OF THE INVENTION

The invention relates to a wiper blade device having a wiper blade adapter and a wiper strip unit.

It is proposed that the wiper strip unit has at least one fastening recess which, in at least one operating state, forms a positive fit with the wiper blade adapter, whereby the wiper blade adapter can be assembled particularly rapidly with the wind deflector element. In this connection, a "wiper blade adapter" should be understood to mean in particular an adapter which is provided for providing a coupling region of the wiper blade device for coupling to a wiper arm. Here, in this context, a "wiper strip unit" should be understood to mean in particular a unit which is provided for connecting a wiper blade adapter to a wiper lip. "Provided" should be understood to mean in particular specially configured and/or equipped. In this way, the wiper blade adapter can be assembled on the wiper strip unit in a particularly inexpensive and stable manner.

It is also proposed that the wiper blade adapter have at least one fastening means which, in at least one operating state, forms a positive fit with a wind deflector element of the wiper strip unit and prevents a movement of the wiper strip unit relative to the wiper blade adapter in a longitudinal direction, whereby particularly secure assembly of the wiper blade device can be attained. In this context, a "wind deflector element" should be understood to mean in particular an element which is provided for deflecting a relative wind acting on the wiper blade device and/or for pressing the wiper lip against a vehicle window. The wind deflector element preferably has at least one concave surface. In this context, a "longitudinal direction" should be understood to mean in particular a direction which extends substantially parallel to a longitudinal extent of the carrier element. In this context, a "longitudinal extent" should be understood in particular to mean a maximum possible extent. In this context, "substantially" should be understood to mean in particular a deviation of less than 10°, preferably of less than 5°. In this context, an "extent" of an element should be understood to mean in particular a maximum spacing between two points of a perpendicular projection of the element onto a plane.

The wiper blade adapter can be held securely on the wiper strip unit if the wiper strip unit has at least one resiliently elastic carrier element which, in at least one operating state, forms a positive fit with the wiper blade adapter. In this context, a "resiliently elastic carrier element" should be understood to mean in particular an element which has at least an extent which, in a normal operating state, can vary elastically by at least 10%, in particular by at least 20%, preferably by at least 30% and particularly advantageously by at least 50%, and which in particular generates a counteracting force, which counteracting force is dependent on the variation of the extent and is preferably proportional to the variation and counteracts the variation.

The wiper blade adapter can be held particularly securely on the wiper strip unit if the positive fit between the carrier element and the wiper blade adapter prevents a movement of the carrier element relative to the wiper blade adapter in a longitudinal direction.

Particularly simple assembly of the wiper blade device can be attained if the carrier element has at least one detent means which, in at least one operating state, forms a detent connection with the wiper blade adapter. In this context, a "detent means" should be understood to mean in particular a means which is provided for producing a detent connection with a resiliently elastic component which, for assembly, is deflected. The detent means is preferably in the form of a detent recess.

If the wiper strip unit has a wind deflector element and a wiper lip which are formed in one piece, a particularly durable and inexpensive connection can be produced between the wiper lip and the wind deflector element. "In one piece" should be understood to mean in particular cohesively connected, such as for example by means of a welding process and/or adhesive bonding process etc., and particularly advantageously integrally formed, such as by means of production by casting and/or by a single-component or multi-component injection molding process.

It is also proposed that the wiper blade adapter have a longitudinal guide unit which is provided for receiving a carrier element with a positive fit, whereby it can be achieved that the carrier element is received in a particularly secure manner. In this context, a "longitudinal guide unit" should be understood to mean in particular a unit which is provided for providing a guide for a carrier element in a longitudinal direction. The longitudinal guide unit preferably has at least one guide channel which extends in the longitudinal direction and which is provided for forming a positive fit with the carrier unit.

It is also proposed that the wiper strip unit have a longitudinal guide channel which is provided for receiving a carrier element with a positive fit, whereby particularly space-saving and secure assembly of the wiper blade device can be attained. In this context, a "longitudinal guide channel" should be understood to mean in particular a guide channel which, in an assembled state, extends in a main direction of extent parallel to the longitudinal direction.

If the wiper blade adapter is mounted onto the wiper strip unit, wherein at least one fastening means engages into the fastening recess with a positive fit, assembly can take place particularly rapidly.

If, after the wiper blade adapter is mounted onto the wiper strip unit, a carrier element is inserted into the wiper strip unit and into a longitudinal guide unit of the wiper blade adapter, particularly high stability of the wiper blade adapter can be attained.

BRIEF DESCRIPTION OF THE DRAWINGS

Further advantages will emerge from the following description of the drawing. The drawing illustrates an exemplary embodiment of the invention. The drawing, the description and claims contain numerous features in combination. A person skilled in the art will expediently also consider the features individually and combine them to form further meaningful combinations.

In the drawing.

DETAILED DESCRIPTION

Figure 1:
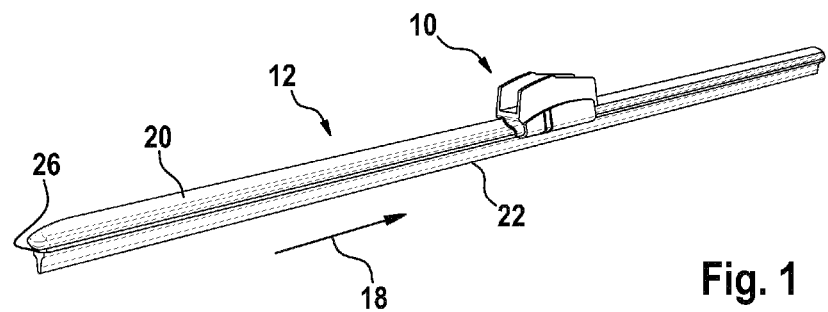
FIG. 1 is a perspective view of a wiper blade device according to the invention in an assembled state.

FIG. 1 is a perspective view of a wiper blade device according to the invention having a wiper blade adapter 10 and having a wiper strip unit 12 in an assembled state. The wiper strip unit 12 has a wind deflector element 20 and a wiper lip 22, which are formed in one piece. A longitudinal guide channel 26 extends within the wiper strip unit 12 along a longitudinal direction 18 which is arranged parallel to a longitudinal extent of the wiper strip unit 12. The longitudinal guide channel 26 is open in the longitudinal direction 18 at both sides.

Figure 2:
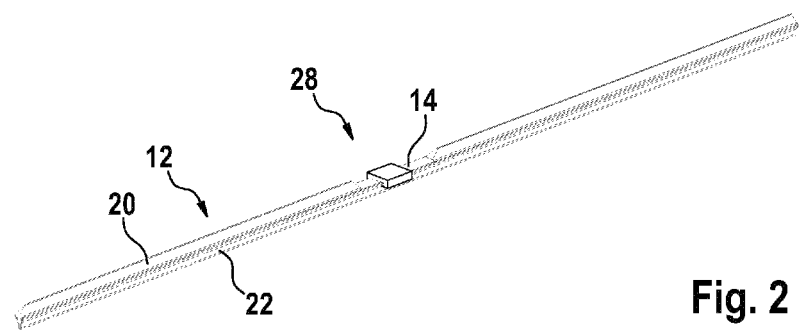
FIG. 2 is a perspective view of a wiper strip unit of the wiper blade device as per FIG. 1.

FIG. 2 illustrates a wiper strip unit 12 according to the invention. In a wiper blade adapter receiving region 28, which extends from 45% to 55% of the longitudinal extent of the wiper strip unit 12 as viewed in the longitudinal direction 18, the wind deflector element 20 has a fastening recess 14. It is however also conceivable in this context for the fastening recess 14 to be arranged outside the wiper blade adapter receiving region 28, and thus asymmetrically on the wiper strip unit 12 as viewed in the longitudinal direction 18. At each free end, the wind deflector element 20 is rounded in the direction of the wiper lip 22 by means of a cut. The use of additional end caps for improving the visual appearance can thereby be avoided.

The wind deflector element 20 which is shown and the wiper lip 22 are produced in a multi-component injection molding process. In this context, other manufacturing methods that would appear expedient to a person skilled in the art are also conceivable, such as in particular other injection molding processes, adhesive bonding processes and/or welding processes which at least lead to an adhesive connection between the wind deflector element 20 and the wiper lip 22.

Figure 3:
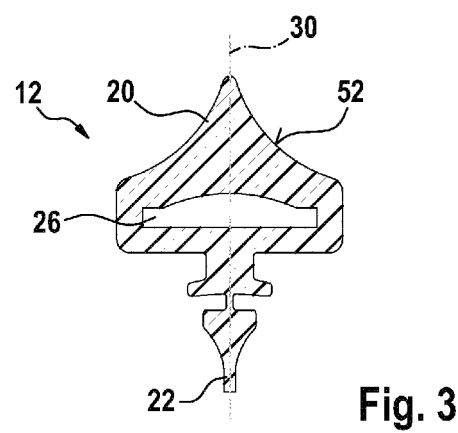
FIG. 3 is a sectional illustration through the wiper strip unit as per FIG. 2.

A section through the wiper strip unit 12 is illustrated in FIG. 3, and shows the wind deflector element 20, the wiper lip 22 and the longitudinal guide channel 26. The wiper strip unit 12 has a plane of symmetry 30 which extends along the longitudinal direction 18. The wind deflector element 20 has laterally arranged convex wind deflecting surfaces 52 which deflect a relative wind and ensure that the wiper lip 22 bears against a windshield (not illustrated) at high speeds.

Figure 4:
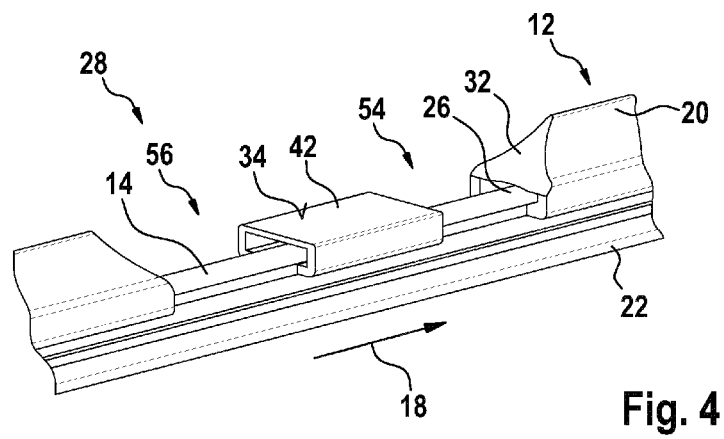
FIG. 4 is a perspective view of a wiper blade adapter receiving region of the wiper strip unit as per FIG. 2.

FIG. 4 shows the wiper blade adapter receiving region 28 of the wiper strip unit 12 in a perspective view. The fastening recess 14 adjoins two side walls 32 of the wind deflector element 20 and has a rest surface 34. The side walls 32 enclose an angle of 45° with respect to the longitudinal direction 18. In this context, it is however also conceivable to use other angle values between the side walls 32 and the longitudinal direction 18 that would appear expedient to a person skilled in the art, such as for example 60°. The side walls 32 therefore enclose an angle of 90° with respect to one another. The rest surface 34 is situated on a rest body 42 which is arranged centrally in the fastening recess 14.

The longitudinal guide channel 26 of the wiper strip unit 12 is open at the side walls 32. The rest body 42 forms a continuation of the longitudinal guide channel 26 within the wiper blade adapter receiving region 28. The longitudinal guide channel 26 is therefore split into two regions 54, 56 as viewed in the longitudinal direction 18.

Figure 5:
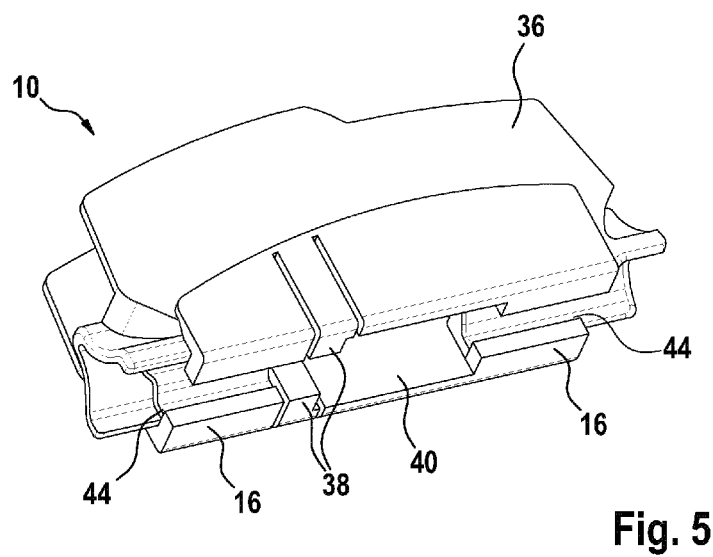
FIG. 5 is a perspective view of a wiper blade adapter of the wiper blade device as per FIG. 1.

The wiper blade adapter 10 is shown in a perspective view in FIG. 5. The wiper blade adapter 10 has a main body 36 on which two fastening means 16 are integrally formed. The fastening means 16 adjoin a central recess 40 of the main body 36. Furthermore, two deflectable detent hooks 38 are arranged on the main body 36. The detent hooks 38 can be deflected transversely with respect to the longitudinal direction 18. In an assembled state, the central recess 40 forms a positive fit with the rest body 42. The wiper blade adapter 10 also has a longitudinal guide unit 24 which comprises four guide grooves 44. The guide grooves 44 extend parallel to the longitudinal direction 18 and are open toward one another. Furthermore, the guide grooves 44 adjoin the central recess 40.

Figure 6:
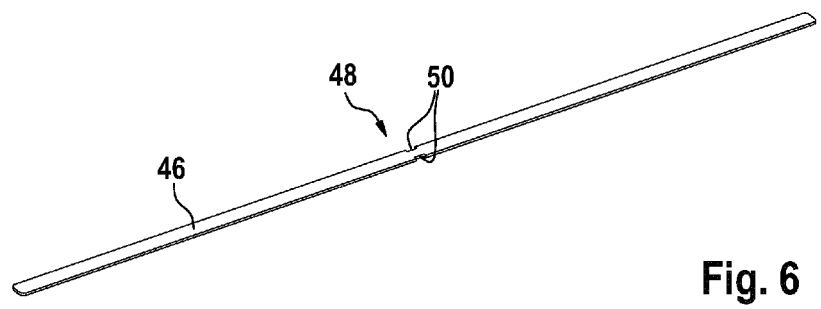
FIG. 6 is a perspective view of a carrier element of the wiper blade device as per FIG. 1.
Figure 7:
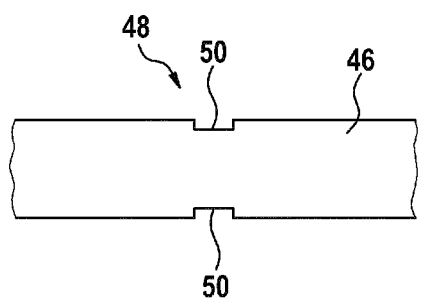
FIG. 7 is a plan view of a detail of the carrier element as per FIG. 6.

FIG. 6 shows a resiliently elastic carrier element 46 of the wiper strip unit 12. The carrier element 46 is composed of a spring steel and has a centrally arranged detent means 48 which comprises two detent recesses 50. The detent recesses 50 are punched out of the spring steel and have a rectangular profile, as illustrated in FIG. 7 in a plan view. The detent recesses 50 are arranged at the same position as viewed in the longitudinal direction 18. Furthermore, the carrier element 46 has a thickness which corresponds to a width of the guide grooves 44.

Figure 8:
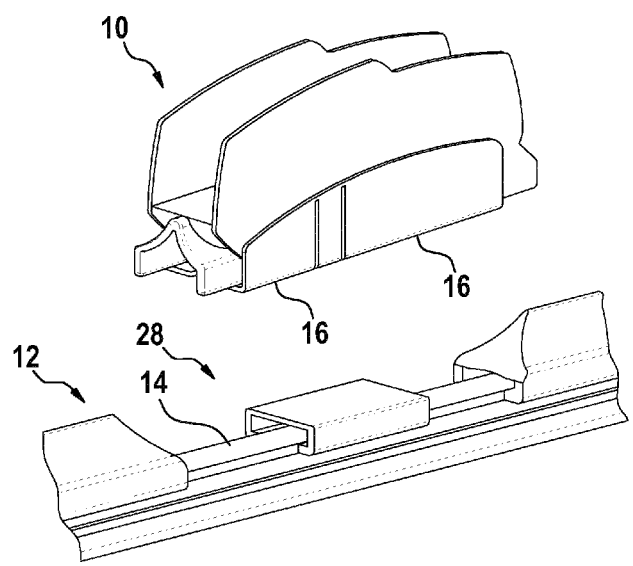
FIG. 8 is a perspective view of the wiper blade device as per FIG. 1 in a first assembly step.

FIG. 8 illustrates a first assembly step of the wiper blade device. The wiper blade adapter 10 is arranged above the wiper blade adapter receiving region 28 of the wiper strip unit 12. If the wiper blade adapter 10 is placed onto the wiper strip unit 12, the fastening means 16 of the wiper blade adapter 10 engages into the fastening recess 14 of the wiper strip unit 12 with a positive fit. The longitudinal guide unit 24 is now arranged in the regions 54, 56 of the wiper strip unit 12. The wiper blade adapter 10 forms a positive fit with the wiper strip unit 12. A movement of the wiper strip unit 12 relative to the wiper blade adapter 10 is prevented in the longitudinal direction 18.

In a second assembly step, the carrier element 46 is inserted into the longitudinal guide channel 26 of the wiper strip unit 12. In the wiper blade adapter receiving region 28, the carrier element 46 passes out of the longitudinal guide channel 26 into the region 54, and is subsequently guided into the guide groove 44 of the longitudinal guide unit 24 of the wiper blade adapter 10.

Figure 9:
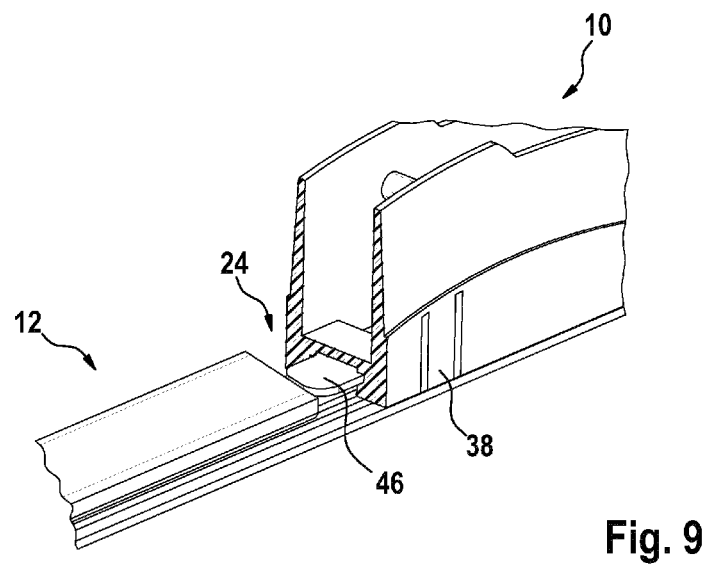
FIG. 9 is a perspective view of the wiper blade device as per FIG. 1 in a second assembly step.

FIG. 9 shows the carrier element 46 which has been pushed all the way through the longitudinal guide unit 24. The carrier element 46 forms a positive fit with the wiper blade adapter 10. The wiper blade adapter 10 can thus no longer be detached from the wiper strip unit 12, but rather is fixedly connected thereto.

Figure 10:
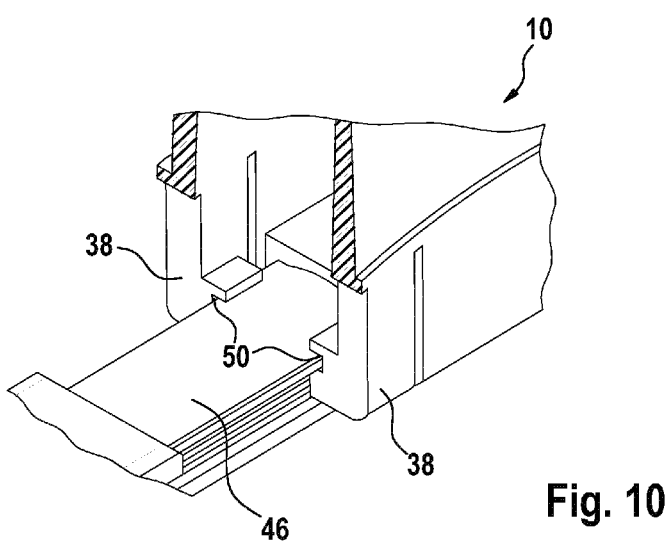
FIG. 10 is a perspective view of the wiper blade device as per FIG. 1 in a third assembly step.

In a third assembly step, the carrier element 46 is pushed further until the detent hooks 38 of the wiper blade adapter 10 engage into the detent recesses 50 of the carrier element 46 and enter into a detent connection, as illustrated in FIG. 10.

Here, the detent hooks 38 are firstly deflected out of an initial position transversely with respect to the longitudinal direction 18, and then move elastically back into the initial position. A positive fit with the detent recesses 50 is thus formed, and a movement of the carrier element 46 relative to the wiper blade adapter 10 in the longitudinal direction 18 is prevented.

By virtue of the carrier element 46 being pushed further, said carrier element passes into the longitudinal guide channel 26 of the wiper strip unit 12 again and forms a positive fit therewith. A movement of the carrier element 46 within the longitudinal guide channel 26 is prevented in all directions.

What is claimed is:

1. A wiper blade device having a wiper blade adapter (10) and having a wiper strip unit (12), characterized in that the wiper strip unit (12) has at least one fastening recess (14) which, in at least one operating state, forms a positive fit with the wiper blade adapter (10), wherein the wiper strip unit includes a rest body (42) arranged centrally in the fastening recess, and wherein the wiper blade adapter has a central recess (40) which, in an assembled state, forms a positive fit with the rest body, wherein the wiper strip unit (12) extends along a longitudinal axis, wherein the central recess (40), in a pre-assembled state, extends over the rest body (42) and forms the positive fit with the rest body (42), such that the wiper blade adapter (10) is prevented from moving relative to the wiper strip unit (12) along the longitudinal axis due to the positive fit with the rest body (42) and with the fastening recess (14), but is otherwise able to be detached from the wiper strip unit (12), and wherein the wiper strip unit (12) has at least one resiliently elastic carrier element (46) which, in an assembled state, has been passed through the wiper blade adapter (10) and forms a positive fit with the wiper blade adapter (10) in order to prevent a movement of the carrier element (46) within a longitudinal guide channel (26) of the wiper strip unit (12) in all directions.

2. The wiper blade device as claimed in claim 1, characterized in that the wiper blade adapter (10) has at least one fastening means (16) which, in at least one operating state, forms a positive fit with a wind deflector element (20) of the wiper strip unit (12) and prevents a movement of the wiper strip unit (12) relative to the wiper blade adapter (10) in a longitudinal direction (18).

3. The wiper blade device as claimed in claim 1, characterized in that the carrier element (46) has at least one detent means (48) which, in at least one operating state, forms a detent connection with the wiper blade adapter (10).

4. The wiper blade device as claimed in claim 1, characterized in that the wiper strip unit (12) has a wind deflector element (20) and a wiper lip (22) which are formed in one piece.

5. The wiper blade device as claimed in claim 1, characterized in that the wiper blade adapter (10) has a longitudinal guide unit (24) which receives the carrier element (46) with a positive fit.

6. A method for assembling a wiper blade device as claimed in claim 1, characterized in that the wiper blade adapter (10) is mounted onto the wiper strip unit (12), wherein at least one fastening means (16) of the wiper blade adapter (10) engages into the fastening recess (14) with a positive fit.

7. The wiper blade device as claimed in claim 1, wherein the rest body (42) has a larger width than a remainder of the wiper strip unit (12) in an area of the fastening recess (14), the width being measured along a direction that is perpendicular to the longitudinal axis.

8. The wiper blade device as claimed in claim 1, wherein the rest body (42) is integrally formed as part of the wiper strip unit (12).

9. The wiper blade device as claimed in claim 1, wherein the rest body (42) has a generally rectangular cross-sectional shape.

10. The wiper blade device as claimed in claim 1, wherein the wiper blade adapter (10) directly contacts the elastic carrier element (46).

11. The wiper blade device as claimed in claim 1, wherein the elastic carrier element (46) includes detent recesses (50), and wherein the wiper blade adapter (10) includes detent hooks (38) that extend into the detent recesses (50).

12. The wiper blade device as claimed in claim 11, wherein each of the detent hooks (38) wraps around a portion of a top side and a bottom side of the elastic carrier element (46).

* * * * *